Patented July 24, 1923.

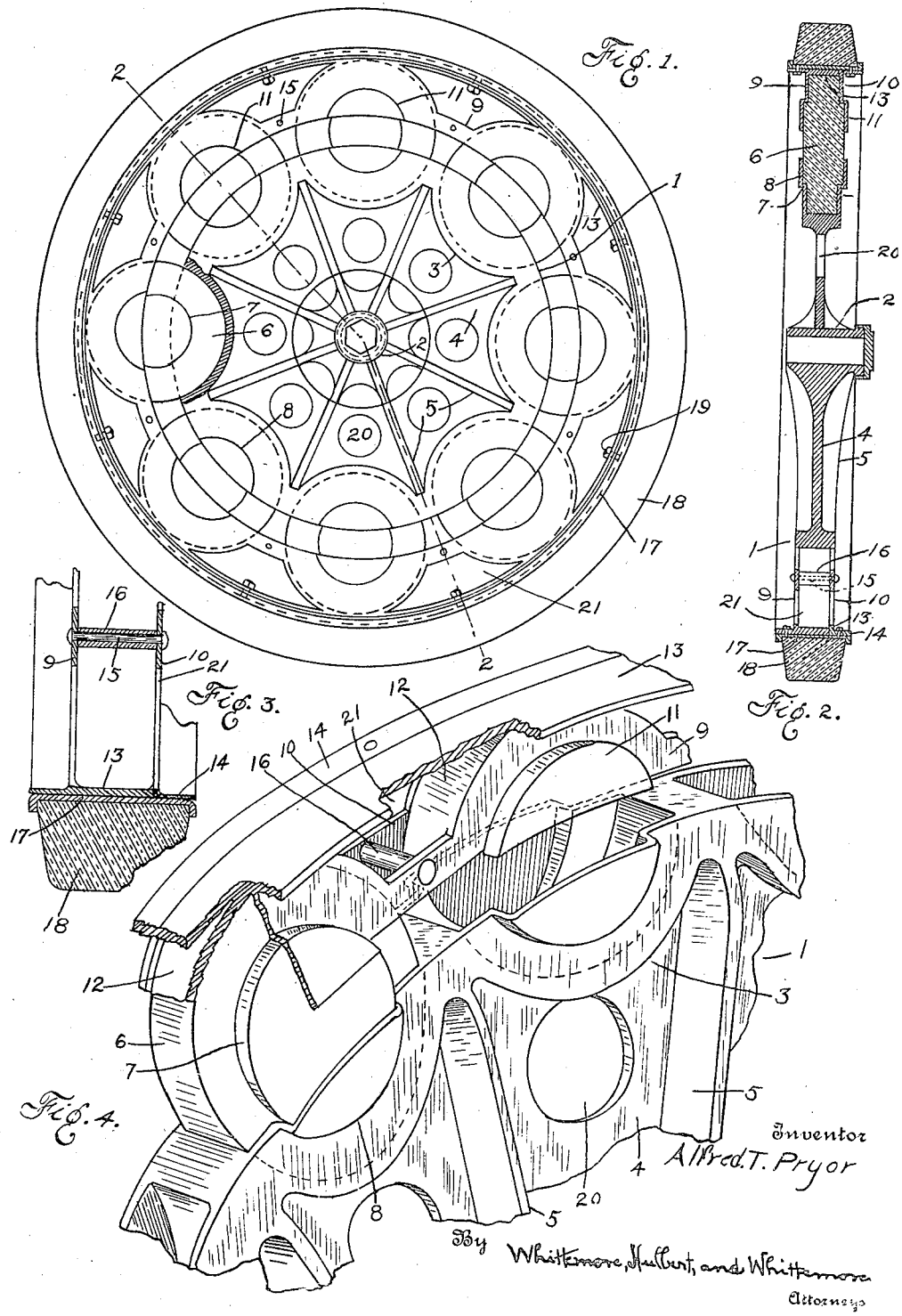

1,462,624

UNITED STATES PATENT OFFICE.

ALFRED T. PRYOR, OF DETROIT, MICHIGAN.

RESILIENT WHEEL.

Application filed June 4, 1920. Serial No. 386,427.

*To all whom it may concern:*

Be it known that I, ALFRED T. PRYOR, a citizen of the United States of America, residing at Detroit, in the county of Wayne and State of Michigan, have invented certain new and useful Improvements in Resilient Wheels, of which the following is a specification, reference being had therein to the accompanying drawings.

This invention relates to resilient vehicle wheels and more particularly to vehicle wheels such as provide means intermediate the rim and hub for absorbing shocks.

It is the object of the invention to provide a series of cushioning members formed of rubber or the like, intermediate an inner and outer portion of a vehicle wheel and to provide pockets in each of said portions of the wheel for engaging said cushioning members.

In the drawings:

Figure 1 is a view in side elevation of the improved wheel;

Figure 2 is a sectional view of the same taken upon line 2—2 of Figure 1;

Figure 3 is a sectional view of a portion of the wheel as shown in Figure 2, but drawn to an enlarged scale;

Figure 4 is a fragmentary perspective view of an outer portion of the wheel showing one of the cushioning members and pockets for receiving two of such members.

In these views the reference character 1 designates a spider having the hub 2, and formed with a plurality of peripheral pockets 3. Said hub and pockets are connected by a web member 4, which is reinforced by a series of radial ribs 5. Within each of said pockets there is snugly engaged the inner portion of a disk shaped cushioning member 6, preferably formed of rubber, said members 6 being formed upon their lateral faces with bosses 7, to accommodate which the side walls of the pockets 3 are embossed as indicated at 8. The outer portions of the cushioning members 6 are engaged between annular plates 9 and 10, which plates are outwardly spaced from the spider member 1, each of said plates being provided with the embossed portions 11 to accommodate the bosses 7. The plate 9 is integrally formed with segmental members 12 providing seats for the periphery of the cushioning members 6. Thus, it is seen that the two annular members 9 and 10 jointly form an outer series of pockets, complementary to the pockets 3 of the spider member, said inner and outer pockets co-acting to hold the cushioning members. The member 9 is formed peripherally with a rim portion 13, and the member 10 is peripherally flanged at 14 to form a complementary rim portion, which in the assembled relation of the parts is flush with the portion 13, as is clearly evidenced in Figure 4. The two members 9 and 10 are secured together by a series of bolts or rivets 15, which are arranged preferably in alternation with the cushioning members 6, and which carry spacer sleeves 16. The rim members 13 and 14 jointly carry the rim 17 upon which an ordinary solid tire 18 is secured, a series of bolts 19 serving to hold the rim member 17 upon the inner rim formed by members 13 and 14. To reduce the weight of the wheel, it is preferred to form series of apertures 20 and 21, respectively, in the spider member 1 and in the plates 9 and 10.

Preferably the spider member 1 will be of malleable casting, while the annular members 9 and 10 may be similarly produced, or may be stamped from sheet material. In the use of the described wheel, shocks or jars encountered at the rim thereof, are largely absorbed through a compression of the cushioning members 6, so as to either prevent, or materially reduce the transmission of such shocks and jars to the vehicle which is equipped with said wheel. It will be observed that the portions of the cushioning members which are seated within the pockets of the inner and outer portions of the wheels, are so fixed as to restrain the cushioning members against undue lateral distortion, and it is a further feature of the invention that said pockets provide seats for considerable portions of the peripheries of the cushioning members, and thus cause the stresses to act upon said members throughout their entire diameter, so as to take full advantage of the resilience of said members. The spaced relation of the outer and inner members of the wheel, is such as to adequately provide for any momentary eccentricity that may occur between the inner and outer portions of the wheel, due to transmission of stresses.

What I claim as my invention is:

1. A resilient vehicle wheel, comprising an inner member formed with a series of peripheral pockets, and an annular outer member provided with a complementary series of pockets, and disk shaped cushioning members interposed between said inner member and annular member for snugly engaging the pockets thereof, said members having their sides formed with opposed bosses and said pockets being embossed to accommodate the bosses of said cushioning members.

2. A resilient vehicle wheel, comprising an inner member formed with a series of peripheral pockets, cushioning members snugly engaging in said pockets, and a pair of annular outer members jointly forming pockets snugly engaged by said cushioning members, complementary to the pockets of the inner member, said outer members having integral complementary rim portions.

3. A resilient vehicle wheel comprising an inner member formed with a series of peripheral pockets, an annular outer member provided with a complementary series of pockets, and disk shaped cushioning members interposed between said inner member and annular member for snugly engaging the pockets thereof, the central portions of said cushioning members being thickened to reinforce said members against transverse stresses.

4. A resilient vehicle wheel comprising an inner member, pockets formed integral with said inner member, cushioning members engaging said pockets, and a pair of annular outer members having portions jointly forming pockets and engaging said cushioning members.

5. A resilient vehicle wheel comprising an inner member, reinforcing means upon said inner member, pockets formed integral with said inner member between said reinforcing means, and a pair of outer members jointly forming pockets and engaging said cushioning members.

6. A resilient vehicle wheel comprising an inner member, pockets formed integral with said inner member, cushioning members engaging said pockets, a pair of annular members jointly forming pockets and engaging said cushioning members, and means between the last mentioned pockets for securing the said annular members in spaced relation.

7. A resilient vehicle wheel comprising an inner member formed with a series of peripheral pockets, portions of said pockets being embossed, a pair of annular members having portions jointly forming pockets, the pockets formed by said annular members having embossed portions, and cushioning members disposed between said inner member, and outer members engaging said pockets and having portions engaging said embossed portions of said pockets.

In testimony whereof I affix my signature.

ALFRED T. PRYOR.